United States Patent [19]

Ross

[11] Patent Number: 4,918,740
[45] Date of Patent: Apr. 17, 1990

[54] PROCESSING MEANS FOR USE IN AN OPTICAL CHARACTER RECOGNITION SYSTEM

[75] Inventor: David J. Ross, Menlo Park, Calif.

[73] Assignee: Palantir Corporation, Santa Clara, Calif.

[21] Appl. No.: 384,053

[22] Filed: Jul. 21, 1989

Related U.S. Application Data

[63] Continuation of Ser. No. 144,622, Jan. 11, 1988, abandoned, which is a continuation of Ser. No. 782,742, Oct. 1, 1985, abandoned.

[51] Int. Cl.$^4$ .............................................. G06K 9/34
[52] U.S. Cl. ......................................... 382/9; 382/13
[58] Field of Search ................... 382/9, 13, 22, 25, 40, 382/45, 47, 48, 61, 69; 390/730, 731; 364/521, 523

[56] References Cited

U.S. PATENT DOCUMENTS

| | | | |
|---|---|---|---|
| 3,111,646 | 11/1963 | Harmon | 382/9 |
| 4,078,249 | 3/1978 | Lelke et al. | 340/731 |
| 4,121,228 | 10/1978 | Cowe et al. | 340/731 |
| 4,259,661 | 3/1981 | Todd | 382/27 |
| 4,345,245 | 8/1982 | Vella et al. | 382/45 |
| 4,377,803 | 3/1983 | Lotspiech et al. | 382/9 |
| 4,558,461 | 12/1985 | Schlang | 382/9 |
| 4,675,830 | 6/1987 | Hawkins | 340/731 |

OTHER PUBLICATIONS

Azriel Rosenfeld and Avinash C. Kak, *Digital Picture Processing*, 2nd Edition, vol. 2, Chapt. 10, Academic Press, 1982.

K. S. Fu, *Syntactic Pattern Recognition and Applications*, Section 1.6, Appendices A & B, Prentice Hall, 1982.

*Primary Examiner*—Leo H. Boudreau
*Assistant Examiner*—Jose L. Covso
*Attorney, Agent, or Firm*—Steven F. Caserza

[57] ABSTRACT

Means is provided for use in an optical character recognition system to narrow the possible characters associated with a given unknown input character, primarily based upon subline information. This means also serves to add to the possibility set additional possible characters, and to determine point sizes for each character. In the event that the subline information provided is erroneous, the subline information is corrected.

23 Claims, 3 Drawing Sheets

PROCESSING MEANS FOR USE IN AN OPTICAL CHARACTER RECOGNITION SYSTEM

This is a continuation of application Ser. No. 144,622 filed Jan. 11, 1988 now abandoned, which is a continuation of application Ser. No. 782,742 filed Oct. 1, 1985 now abandoned.

BACKGROUND OF THE INVENTION

A wide variety of pattern recognition systems are known in the art. Each such system optically receives data depicting a pattern to be recognized, and performs certain tasks on this pattern in order to compare it to known patterns in order to "recognize" the input pattern. A basic flow chart depicting a pattern recognition system is shown in FIG. 1. The input pattern is the pattern which is desired to be recognized. Digitizer 12 converts input pattern 11 to a series of bytes for storage in system memory 13. If input pattern 11 is basically a black and white figure, these bytes are then typically binary in nature. Digitizers are well known in the art and typically are used in such devices as facsimile machines, electronic duplicating machines (as opposed to optical photocopy machines) and optical character recognition systems of the prior art. Memory 13 can comprise any suitable memory device, including random access memories of well-known design. Segmentation 14 serves to divide the image data stored in memory 13 into individual characters. Such segmentation is known in the prior art, and is described, for example, in *Digital Picture Processing*, Second Edition, Volume 2, Azriel Rosenfeld and Avinash C. Kak, Academic Press, 1982, specifically, Chapter 10 entitled "Segmentation".

Feature extraction means 15 serves to transform each piece of data (i.e., each character) received from segmentation means 14 in order to transform that data into a standard predefined form for use by identification means 16, which in turn identifies each character as one of a known set of characters. Output means 17 serves to provide data output (typically ASCII, or the like) to external circuitry (not shown).

Identification means 16 can be any one of a number of prior art identification means typically used in pattern recognition systems, including, more specifically, optical character recognition systems. One such identification means suitable for use in accordance with the teachings of this invention is described in U.S. Pat. No. 4,259,661, issued Mar. 31, 1981 to Todd, entitled "Apparatus and Method for Recognizing a Pattern". Identification means 16 is also described in *Syntactic Pattern Recognition and Applications*, K. S. Fu, Prentice Hall, Inc., 1982, specifically, Section 1.6, and Appendices A and B.

SUMMARY

In accordance with the teachings of this invention, an optical character recognition system includes an identification means having two subcomponents: character selection and resolution. Character selection serves to identify an unknown input character as one or more possible characters and provide a "possibility set" containing the possible characters. Resolution serves to further narrow the possible characters associated with a given unknown input character, primarily based upon subline information. In one embodiment of this invention, the resolution means also serves to add to the possibility set additional possible characters. In another embodiment of this invention, the resolution means also serves to determine point sizes for each character. In the event the resolution means determines that the subline information provided is erroneous, the resolution means corrects this subline information in order that this corrected subline information can be used, for example, in resolving between a capital "S" and a small "s", and for establishing the point size of a character.

DETAILED DESCRIPTION

Data Input

Figure 2:
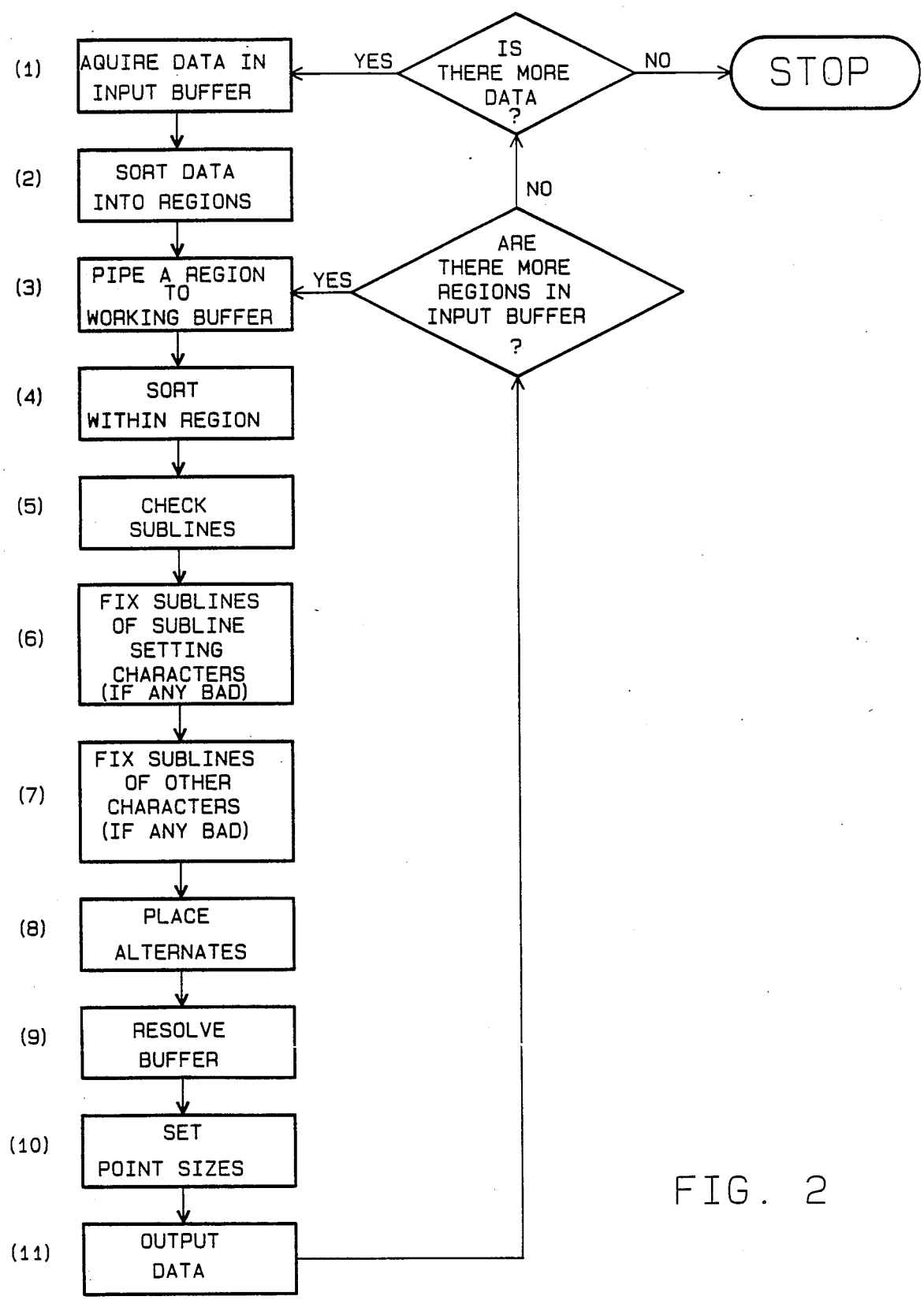
FIG. 2 is a flow chart depicting the operation of one embodiment of this invention.
Figure 4:
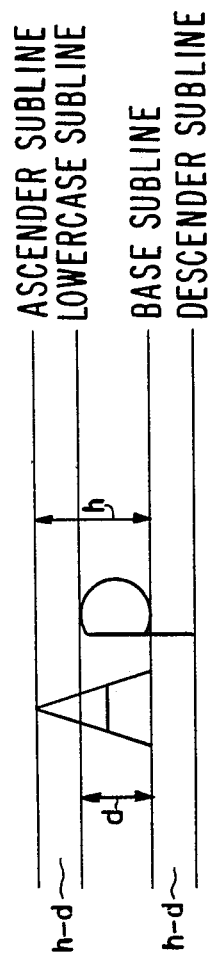
FIG. 4 depicts the relationship between the ascender, lowercase, base, and descender sublines as used in accordance with the teachings of this invention.

FIG. 2 is a flow chart depicting one embodiment of the present invention. The first step is to acquire data. As previously described, this data is obtained from a character selection means. In one embodiment of this invention, 40 characters, as represented by geometries and possibility sets, are loaded into an input buffer (not shown). As used in this specification, geometry refers to information pertaining to an unknown character being read, such as the X and Y positions on a page, the width of the character, the height of the character, the distance from the top of the character to the four sublines (ascender, lowercase, base, and descender sublines as shown, for example, in FIG. 4), a flag indicating whether the character read contains more than a single piece, flags defining whether each of the sublines have been determined for this character, and information defining which contextual region of the page being read contains this character. The possibility set is provided by the character selection means and contains the characters which might possibly be the unknown character being read, together with confidence values therefor, and additionally, a number indicating the number of elements of the possibility set.

Once a block of data is acquired in the input buffer, the data is sorted by contextual region on the page being read. After the data contained in the input buffer has been sorted by contextual region, the lowest numbered region is transferred to a working buffer. The data within the working buffer is then sorted by X position in order that characters are in as near their original order on the page being read as possible. This is necessary because characters in the data stream available during the acquisition of data may have become out of order in the character selection step or other processing step which took place prior to the process of this invention. In this manner, the process of this invention is performed on characters contained in a single contextual region, and within a single contextual region, from left to right.

Check Sublines

Next, the sublines of the data within the working buffer are analyzed character by character to determine whether the sublines associated with each character are accurate. Of importance, only certain characters can be used to determine whether their subline information is correct, as follows:

TABLE 1

| Character Type | Characters | Sublines defined |
|---|---|---|
| "A" | A, B, D, E, F, G, H, K, L, N, R, T, b, d, f, h, k, 2, 3, 4, 5, 6, 7, 8 | Ascender subline and base subline |
| "a" | a, e, n, r | Lowercase subline and base subline |
| "q" | q | Lowercase and descender subline |

These characters are unambiguous (the capital letters look quite different from the small) and virtually always extend between the same two sublines. Their behavior is sufficiently regular to warrant their being used to set sublines for characters which are either ambiguous ("C" vs "c") or irregular ("t").

In one embodiment of this invention, only unknown characters having a single element in their possibility set are used to check subline information (and maintain histograms, as is described later); in another embodiment such single character is used only if it is believed to be the unknown character with a specified degree of confidence; in yet another embodiment, unknown characters having possibility sets containing only characters of a single character type are used for this purpose.

Figure 3:
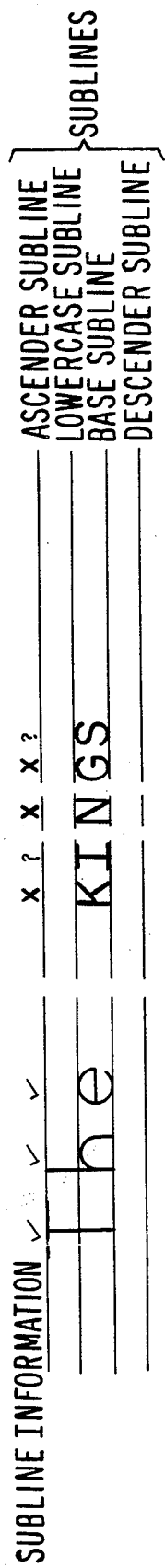
FIG. 3 shows a sample of text read by an optical character recognition system in accordance with the teachings of this invention.

FIG. 3 depicts this operation of checking the sublines. Assume that the phrase "The KINGS" is read, where the word "KINGS" is in a smaller point size than "The". As shown in FIG. 3, the accuracy of the subline information (ascender subline, lowercase subline base subline, and descender subline) is checked for each character in sequence. In FIG. 3, a check mark indicates that the subline information is correct, an "X" indicates that the subline information is incorrect, and a question mark indicates that the subline information cannot be determined to be correct or incorrect for that character. As shown in FIG. 3, the capital "T" and small "h" are determined to have the correct subline information since their tops and bottoms are sufficiently close (in one embodiment, ±2 pixels) to the ascender subline and the base subline, respectively. The small "e" is determined to have correct subline information, since its top is sufficiently close to the lowercase subline, and its bottom is sufficiently close to the base subline. The "K", "N", and "G" in smaller point size are determined to have incorrect subline information since their tops are not sufficiently close to the ascender subline. The "I" and the "S" in the smaller type size are ambiguous characters, not capable of setting subline information. This is because, for example, a capital "S" and a small "s" may be identical if in different point sizes. Similarly, a capital "I" might be identical with a dotless small "i" of a different point size, or similar characters. Of importance, although a character can at most verify subline information for two sublines, upon verification of two sublines for a given character, a mathematical calculation is performed to determine whether the remaining sublines are within tolerance. If so, all four sublines are verified for that character. In one embodiment of this invention, the mathematical relationships used to verify sublines are that the distance between the lowercase subline and the base subline must be within the range of 50 to 85% of the distance between the ascender subline and the base subline. Similarly, the distance from the ascender subline to the base subline must be approximately equal to the distance between the lowercase subline and the descender subline, typically within several pixels.

Fix Sublines of Subline-Setting Characters

The next step is to fix sublines of subline-setting characters known to be in error. In the example shown in FIG. 3, the sublines which are known to be erroneous are the sublines associated with the K, N, and G. Therefore, two new sublines are established for these characters as indicated in Table 1: the ascender subline for each of the characters the K, the N, and the G corresponds to the top of that character and the base subline for each of these characters corresponds to the bottom of that character. The remaining two sublines for each character are established mathematically as described below.

Histograms are maintains during the reading of a page of data. These are an "a" type character histogram and an "A" type character histogram. The "a" type character histogram is maintained showing the number of occurrences of each distance "d" (FIG. 4) between the lowercase subline and the base subline for "a" type characters whose subline information has been confirmed or corrected.

Similarly, the "A" type character histogram is maintained showing the number of ocurrences of each distance "h" (FIG. 4) between either the ascender and base subline pairs (for "A" type characters) or the lowercase and descender subline pairs (for "q" type characters). Both the "A" type histogram and the "a" type histogram may have a number of peaks with, for example, each peak representing a different point size on the page being read. The subline spacings represented at these peaks are used to set the missing subline spacings in "A" and "a" type characters.

In the event that the character is an "a" type character having known lowercase subline and base subline, the ascender subline and the descender subline are calculated by selecting the appropriate peak in the "A" type histogram in the following manner.

To select the appropriate peak, the "A" type histogram is examined over a range h-min to h-max where h-min equals d/0.70 and h-max equals d/0.6, where d equals the distance between the base subline and the lowercase subline for the unknown "a" type character being analyzed. The location of the histogram peak within this range is selected as the value "h" which establishes the ascender subline-base subline distance and the lowercase subline-descender subline distance. In the event that there is no histogram peak within that range, h-min is set to d/0.85 and h-max is set to d/0.5 and the "A" type histogram examined again. If no peak is found on this second scan, h is set equal to d/0.67.

In the case where the character for which sublines are being set is an "A" type character, having know ascender subline and base subline, its lowercase subline and descender sublines are calculated using the "a" type character histogram. This is similar to the procedure for "a" type characters except that the ratios used here are d-min=0.6 h, d-max=0.7 h for the initial scan of the histogram; d-min=0.5 h, d-max=0.85 h for the second scan (used if a peak is not found during the first scan); and d=0.67 h for the default (used if a peak is not found during the first or second passes). The value of d so selected sets the lowercase subline-base subline distance. The lowercase subline-descender subline distance is set equal to h.

"q" type characters, which have known lowercase and descender sublines, have their ascender and base sublines similarly determined, using the histogram and scan limits used for "A" type characters.

These ratios, 0.7, 0.6, 0.85, 0.5, and 0.67 are selected because they are the typical ranges in commercially-available type fonts of the ratio between the height of a small "a" letter and a capital "A". Naturally, other values could be used, if desired. The heights calculated by these ratios are rounded to the nearest whole number of pixels.

Fix Sublines of Other Characters

The indefinite sublines (the sublines of the "I", and "S" of FIG. 3) are then corrected as shown in Table 2.

TABLE 2

| Within this contextual region is there a character having definite sublines to the left of the character in question? | Within this contextual region is there a character having definite sublines to the right of the character in question? | DECISION |
|---|---|---|
| Yes | No | Propogate sublines from closest character to the left having definite sublines. |
| No | Yes | Propogate sublines from closest character to the right having definite sublines. |
| No | No | Do not adjust sublines. |
| Yes | Yes | Set a break at the largest gap (between two adjacent characters) which lies between two characters having definite subline information, and propogate subline information from nearest character having definite sublines which is on same side of break as unknown character. |

As used in Table 2, a "gap" is equal to the number of pixels which form a space between two adjacent characters, or alternatively is equal to any other distance measured between adjacent characters (such as, but not limited to, center-to-center distance). In one embodiment of this invention, the way in which the sublines are propagated from an adjacent character having known valid sublines is to set the new base subline equal to the old base subline plus an adjustment based on the skew of the page, and set the distance between the base subline and the remaining sublines equal for both the old character and the new character. As shown in Table 2, if there is more than one character with known valid sublines in the contextual region containing the characters for which sublines are being set, the sublines associated with the closest character having known valid sublines, on the same side of the largest gap between the two characters with valid sublines, are used to set sublines for the character being processed. In this manner, characters most likely to have point size similar to the point size of the character being processed are used to establish sublines.

Place Alternates

With the subline information now provided as accurately as possible, alternates are placed in the possibility set for some characters stored in the working buffer. A number of characters exist which appear to be identical, or nearly identical, other than size and placement, to other characters. These are shown in Table 3.

TABLE 3

| Possibility Set | Alternates |
|---|---|
| l | I and 1 |
| c | C |
| j | J |
| m | M |
| o | O and 0 |
| p | P |
| s | S |
| u | U |
| v | V |
| w | W |
| x | X |
| y | Y |
| z | Z |
| , | ' |
| — | — |

TABLE 4

| Possibility Set | Alternates |
|---|---|
| / | "italic l, italic I, italic 1" |
| ' | I,l,1 |
| I | 'dotless i' |
| 9 | |

During the "place alternates" operation, the possibility set is examined and if one of these characters in Table 3 is contained within the possibility set, its alternate or alternates are added to the possibility set, together with the confidence value assigned to the original character in the possibility set. This is done with care taken to not duplicate a character which might already be in the possibility set.

Figure 1:
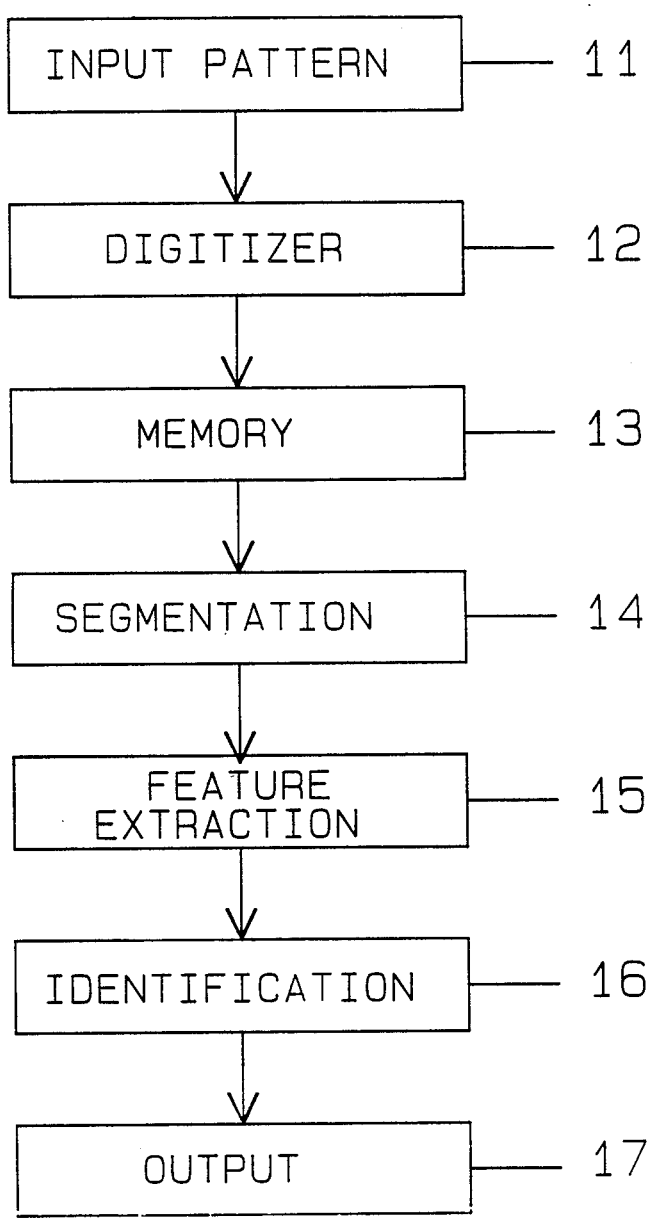
FIG. 1 is a diagram of a prior art optical character recognition system.

In addition to the characters shown in Table 3, Table 4 depicts certain characters which often times are confused during the optical reading of text input during the optical character recognition process, even though they are rarely exactly identical. Since subline information provides additional information as to which character of the character pairs in Table 4 is actually proper, the alternates are added to the possibility set, provided the character in the possibility set has sublines appropriate to the character in the Alternate column. Of importance, in one form of character selection means of FIG. 1, since the characters in Table 3 appear very similar if not identical to their alternates, the character selection means only provides the characters contained in the left column of Table 3. However, the character selection means can provide to the possibility set any of the characters contained within Table 4, although due to their similarities, they may be in error, with one confused with another. For example, if the possibility set contains a "1", the alternates shown in Table 3 ("I" and a "l") are added to the possibility set. However, the subline information is also analyzed to determine if characters contained in Table 4 should be added to the possibility set. In the example given, where the possibility set contains an "1", and if the bottom of the character is located on or near the base subline, and the top of the character is located on or near the lowercase subline, an "i" is added to the possibility set, assuming that the unknown character being analyzed is a "dotless i". Similarly, if the possibility set contains a "9" and the bottom of the character is located on or near the descender subline and the top of the character is located on or near the lowercase subline, a "g" is added to the possibility set. In this manner, characters in Table 4 are added to the possibility set only if they are likely to be the unknown character being analyzed. Characters in Table 3 are always added to the possibility set for later resolution.

Resolution

For each character in the working buffer, its possibility set is resolved in order to, if possible, remove from the possibility set characters which can be determined do not match the existing subline data, as corrected, and which therefore cannot possibly be the unknown character being read. However, if during this resolution step all character candidates originally contained in the possibility set are eliminated, the resolution step has not aided in the identification of the unknown character being read, and therefore all of the elements of the possibility set remain in the possibility set for further analysis, if desired, by other devices (not shown).

set. For example, if a character is though to be either an "i" or an "1" and is known to be of two pieces, the "1" is excluded and the "i" retained. If the character top is nearest the ascender subline, and the character bottom is nearest the base subline, and the character has one piece, "i" might be excluded and "1" retained. If, on the other hand, the top of the character is nearest the lowercase subline, the character is assumed to be a "dotless i" which has only one piece, and the "1" is excluded while the "i" is retained.

Set Point Sizes

In one embodiment of this invention, a process is now performed which attaches to the data identifying each character being processed an indication of that character's point size. In most instances, located within a contextual region are a confirmed ascender subline and a confirmed base subline. This will be referred to as Case I. If this is not the case, there is a likelihood that located within a contextual region are a confirmed lowercase subline and descender subline (Case II). If neither Case I or Case II exists, it is possible that there is a confirmed lowercase subline and base subline (Case III). The remaining case (Case IV) is that, within a contextual region, there is not a confirmed subline of any type. Cases I through IV are depicted in Table 6.

TABLE 5

| Reference Character | Allowed Upper Sublines | | | | Allowed Lower Sublines | | | |
|---|---|---|---|---|---|---|---|---|
| | Ascender Subline | Lowercase Subline | Base Subline | Descender Subline | Ascender Subline | Lowercase Subline | Base Subline | Descender Subline |
| A | X | | | | | | X | |
| a | | X | | | | | X | |
| C | X | | | | | | X | |
| c | | X | | | | | X | |
| I | X | | | | | | X | |
| i | X | X | | | | | X | |
| 1 | X | | | | | | X | |
| ' | X | X | | | | X | | |
| , | | X | X | | | | X | X |
| P | X | | | | | | X | |
| p | | X | | | | | | X |

For each character in the possibility set, a table look up is performed (as shown in Table 5) to determine the allowed upper sublines and the allowed lower sublines which must be at or near the top and bottom of the character, respectively, if that character is a valid possibility. For example, if the possibility set contains an "A", and the data corresponding to the unknown character being read does not indicate that the top of the character is at or near the ascender subline or that the bottom of the character is not at or near the base subline, the unknown character cannot possibly be an "A". Similarly, as is often the case at this stage of the processing of the unknown character, the possibility set may very well contain both a "C" and a "c". By doing a table look-up of both of these characters, it is determined based upon subline information that at least one of these characters is impossible, and such character is thus removed from the possibility set (provided that at least one character remains in the possibility set after all disqualified characters are removed). In this manner, the possibility set has been reduced as much as possible based upon subline information.

In one embodiment of this invention, the number of pieces of which the character is composed has been determined in some previous processing step. This information is also used, sometimes along with subline information, to exclude characters from the possibility

TABLE 6

| Case | Confirmed Sublines |
|---|---|
| I | ascender and base |
| II | lowercase and descender |
| III | lowercase and base |
| IV | none |

As far as point size is concerned, Case I and Case II are identical, since in commercially available type fonts the distance h (FIG. 4) between the ascender subline and the base subline is substantially equal to the distance between the lowercase subline and the descender subline. In this event, this distance h is used to perform a table look-up using the "A" character type height histogram, which has been prepared as previously described. This look-up is performed in order to find the histogram peak within a certain predetermined variation of subline spacing. In other words, if the unknown character being processed has a subline spacing h between the ascender subline and base subline of 29 pixels, the table look-up is performed over the range of, for example, 27–31 pixels and the histogram peak located within this region is then used as the subline spacing for this character being processed insofar as the calculation of point size is concerned.

In Case III, the "A" character type height histogram is accessed first over the range of d/0.6 to d/0.7 which is the lowercase-base subline spacing, and then, if no peak is found, the "A" character type height histogram is accessed over the range of d/0.5 to d/0.85 and, for the purposes of determining point size, the histogram peak located is used as the subline spacing for this character being processed. If no peak is then found, the whole number nearest d/0.67 is used as the subline spacing for the character being processed.

In Case IV, although subline information has not been confirmed, subline information is present for each character being processed. Since all characters have associated therewith either the ascender subline and base subline, or lowercase subline and descender subline information, or both, this information is used to access the "A" character type height histogram, as in Cases I and II. If the unknown character contains ascender and base subline information as well as lowercase and descender subline information, it is preferable that the ascender and base subline information be used to access the "A" character type height histogram, because in general a much greater number of characters are used to establish the ascender and base sublines as compared with the number of characters used to establish the lowercase and descender sublines, thereby enhancing their accuracy.

Regardless of which of Cases I through IV occurs, once the table look-up is performed using the "A" character type height histogram, the resultant subline spacing is divided by a constant in order to determine the point size. In one embodiment of this invention, this constant equal to 2.9, which corresponds to the unique manner in which point size has been historically expressed. In days of old, the point size was defined as the distance between the top of the top shoulder (the edge of a block of lead) of a "T" and the bottom of the bottom shoulder of a "p", as measured in 72nds of 0.996 inch, where 0.996 is a constant representing the ratio of lineal dimensions of cold versus hot lead. Thus, the constant 2.9 most accurately converts the subline spacing from pixels to point size when one pixel is equal to 1/300 inches.

In one embodiment of this invention, in order to save processing time, the conversion from subline spacing to point size is performed by a table look-up, rather than a floating point division operation.

In one embodiment of this invention, hysteresis is used in order to smooth the variations in point sizes, in order to minimize the effects of noise during the reading of the unknown characters. In other words, the allowable change in point size between sequential characters must be greater than a predetermined number prior to causing a change in point size. In one embodiment of this invention, in Cases I and II above, since their subline information is relatively accurate, the point size determined as described above must change by more than one point size between sequential characters in order for that change in point size to be considered valid. In Cases III and IV, because the subline information is less accurate than in Cases I and II, a point size change equal to ¼th of the previous point size value must take place prior to considering the new point size to be valid. Other point size smoothing criteria may, of course, be used.

Output Data

As a final step shown in FIG. 2, the data contained in the working buffer, together with the newly calculated sublines and point sizes and altered possibility sets, are output to additional circuitry (not shown) for further processing if necessary. Then, as shown in FIG. 2, if more data is available for processing, it is loaded into the input buffer. The data now in the input buffer is sorted by region and processed as previously described. If there is no more data to be acquired, the data within the input buffer is processed, region by region, as previously described.

While this specification illustrates specific embodiments of this invention, it is not to be interpreted as limiting the scope of this invention. Many embodiments of this invention will become evident to those of ordinary skill in the art in light of the teachings of this specification.

I claim:

1. The method of analyzing character information consisting of pixel data and subline information of unknown characters to determine the character type of each of said unknown characters, said method comprising the steps of:

fetching a plurality of character information segments, each representing a character and including subline information consisting of the location of that character's ascender line, lowercase line, base line, and descender line with respect to the pixels forming that character;

for a selected one of said character information segments, determining if said subline information is accurate based upon comparison with the subline information of a selected one of said character information segments;

providing accurate subline information by resetting said subline information of said selected one of said character information segments, with respect to the pixels forming that character, if inaccurate, without altering the subline information of character information segments corresponding to adjacent characters; and using said accurate subline information to determine the character type of said selected one of said character information segments.

2. The method as in claim 1 wherein the step of resetting said subline information is performed by utilizing the height of the character and information regarding the character's type.

3. The method of claim 2 wherein the character's type is selected from the group of character types consisting of:

"A" type characters, wherein the topmost pixel of the character corresponds to the ascender subline and the bottommost pixel of the character corresponds to the base subline;

"a" type characters, wherein the topmost pixel of the character corresponds to the lowercase subline and the bottommost pixel of the character corresponds to the base subline; and "q" type characters, wherein the topmost pixel of the character corresponds to the lowercase subline and the bottommost pixel of the character corresponds to the descender subline.

4. The method of claim 1 wherein said selected one of said character information segments has known accurate subline information.

5. The method of claim 1 wherein said selected one of said character information segments and said selected one of said character information segments which is being reset are located within said plurality of character information segments on the same side of the largest gap located between two adjcent character information segments which in turn are located between two character information segments having accurate subline information.

6. The method of claim analyzing character information consisting of pixel data and subline information of unknown characters to determine the character type of each of said unknown characters, said method comprising the steps of:

fetching a plurality of character information segments, each representing a character and including subline information consisting of the location of that character's ascender line, lowercase line, base line, and descender line with respect to the pixels forming that character;

for a selected one of said character information segments, determining if said subline information is accurate based upon comparison with the subline information of a selected one of said character information segments;

providing accurate subline information by resetting said subline information of said selected one of said character information segments, with respect to the pixels formming that character, if inaccurate; and using said accurate subline information to determine the character type of said selected one of said character information segments, wherein the subline spacings of the characters are used to access a histogram of subline spacings defined, at least in part, by the subline spacings of said plurality of character information segments in order to locate a relative maximum for use in resetting the subline information.

7. The method of claim 6 wherein said histogram is an "a" character type histogram maintained for the occurrences of values of distance between the base subline and lowercase subline for each "a" type character wherein the topmost pixel of the character corresponds to the lowercase subline and the bottommost pixel of the character corresponds to the base subline.

8. The method of claim 7 wherein the "a" character type histogram is scanned over a range of approximately 0.6 h to 0.7 h, where h is an "A" type character's height, to locate a relative maximum for use as the distance between the lowercase subline and the base subline on the "A" type character wherein the topmost pixel of the character corresponds to the ascender subline and the bottommost pixel of the character corresponds to the base subline.

9. The method of claim 8 wherein, if a relative maximum is not located, the "a" character type height histogram is scanned over a range of approximately 0.5 h to 0.85 h to locate a relative maximum.

10. The method of claim 9 wherein 0.67 h is used as a maximum if a relative maximum is not found.

11. The method of claim 6 wherein said histogram is an "A" character type histogram maintained for the occurrence of values of distance between the ascender subline and base sublines for each "A" type character wherein the topmost pixel of the character corresponds to the ascender subline and the bottommost pixel of the character corresponds to the base subline.

12. The method of claim 11 wherein the "A" character type height histogram is scanned over a range of approximately d/0.6 to d/0.7, where d is an "a" type character's height, to locate a relative maximum for use as the distance between the ascender subline and the base subline on the "a" type character.

13. The method of claim 12 wherein, if a relative maximum is not located, the "A" character type height histogram is scanned over a range of approximately d/0.5 to d/0.85 to locate a relative maximum.

14. The method of claim 13 wherein d/0.67 is used as a maximum if a relative maximum is not found.

15. The method as in claim 6 wherein said step of providing accurate subline information is performed without altering the subline information of character information segments corresponding to adjacent characters.

16. The method of determining point size of an optically read character based upon detected pixel location within said character, comprising the steps of:

obtaining a data set defining the pixel locations of said optically read character;

using said pixel locations to determine subline information for said optically read character, said subline information comprising ascender line, lowercase line, base line, and descender line;

using said subline information to find a relative maximum in a character height histogram defining the heights of a plurality of characters; and using said relative maximum to define point size.

17. The method of claim 16 wherein said relative maximum is divided by a constant to define point size.

18. The method of claim 17 wherein said constant is 2.9 when one pixel is equal to 1/300 inch.

19. The method of claim 17 wherein said relative maximum is used to perform a table look-up operation to define point size.

20. The method of claim 16 wherein point size variations between adjacent characters must be greater than a selected amount to be considered a valid variation in point size.

21. The method of claim 20 wherein said selected amount is one point size.

22. The method of claim 20 wherein said selected amount is a selected fraction of the point size calculated for the previous character.

23. The method of claim 22 wherein said selected fraction is one fourth.

* * * * *